Sept. 9, 1958   C. E. POYNTER   2,850,950
SURFACE BROACHING MACHINES
Filed June 22, 1956   2 Sheets-Sheet 1

Inventor
CYRIL E. POYNTER
By

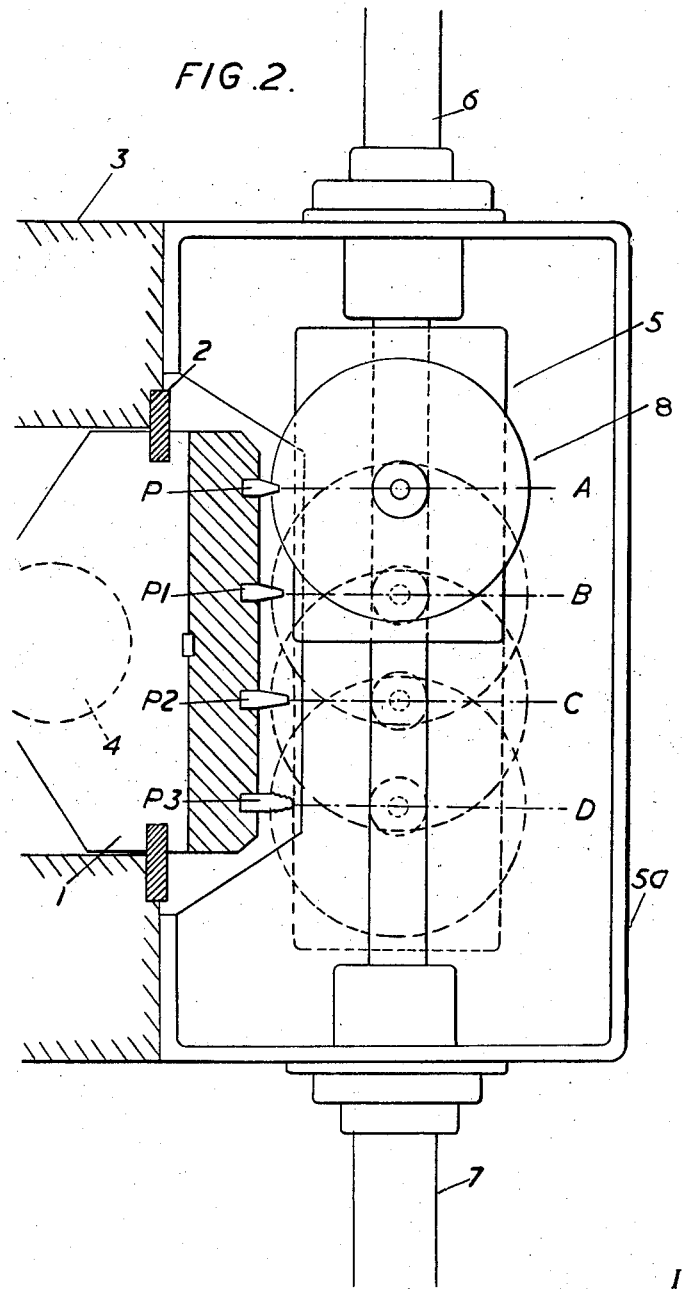

United States Patent Office 2,850,950
Patented Sept. 9, 1958

2,850,950

SURFACE BROACHING MACHINES

Cyril Edward Poynter, Biggleswade, England, assignor to Weatherley Oilgear Limited, Biggleswade, England Application June 22, 1956, Serial No. 593,261

Claims priority, application Great Britain February 2, 1956

1 Claim. (Cl. 90—33)

This invention concerns an improvement or modification in surface broaching machines as disclosed in my copending application No. 544,282.

In the above numbered application I have described and claimed, inter alia, a surface broaching machine having a work table for holding at least one workpiece, a broach bar drivable on both forward and reverse strokes, at least one pair of broach tools secured to the bar with the teeth of one tool oppositely disposed to those of the other tool and means for shifting the said work table transversely of the stroke of the bar to bring the work piece into operative relationship with one tool on a forward stroke of the bar and with the other tool on a reverse stroke of the bar.

I have now appreciated that the sphere of usefulness of the broaching machine can be materially increased by tooling the broach bar with a tool or tools adapted to cut on one stroke only of the bar where this is appropriate to a job in hand and shifting the work table transversely of the stroke of the bar to take the work out of the path of the tool or tools on a reverse stroke of the bar.

In other words the restriction in the parent application to the use of tools with oppositely disposed teeth may not always be necessary or desirable; and a machine inherently adapted to perform work on forward and reverse strokes may be advantageously used in certain cases, at least partially, as a "one-way" machine.

The present invention thus comprises the improvement or modification in a surface broaching machine as described in the parent application which consists in omitting from the broach bar one or more or all of the tools adapted to operate upon the work in one given direction of movement of the bar whereby the machine may be permitted at least one idle stroke in a cycle of operation upon the work when the work is shifted transversely out of the path of a tool or tools secured to the bar.

Where all the tools with teeth disposed for operating in one given direction are omitted the machine can obviously only operate as a "one-way" machine; but if one or more sets of such tools are retained a mixed operation may be performed. For example in a machine with four transversely spaced stations for the work-table, a rough cut could be made on an "in" stroke of the bar, a semi-finishing cut on an "out" stroke of the bar, followed by an idle "in" stroke and a final finishing cut on an "out" stroke, the work being shifted transversely of the bar between each stroke and no tool being fitted at the third station.

The transverse movement of the work-holding table can be performed in a straight line parallel to the face of the broach bar and this is the simplest method, but, of course, the table could be directed through a path having a component normal to the broach bar surface, in which case the table would move away from and back towards the broach bar as well as transversely in carrying the work from one station to another.

One preferred form of improved or modified surface broaching machine and examples of its possible modes of use will now be described in some detail to illustrate the invention with reference to the accompanying drawings, in which:

Fig. 2 is a diagrammatic vertical cross-section on the line II—II of Fig. 1.

Figure 1:
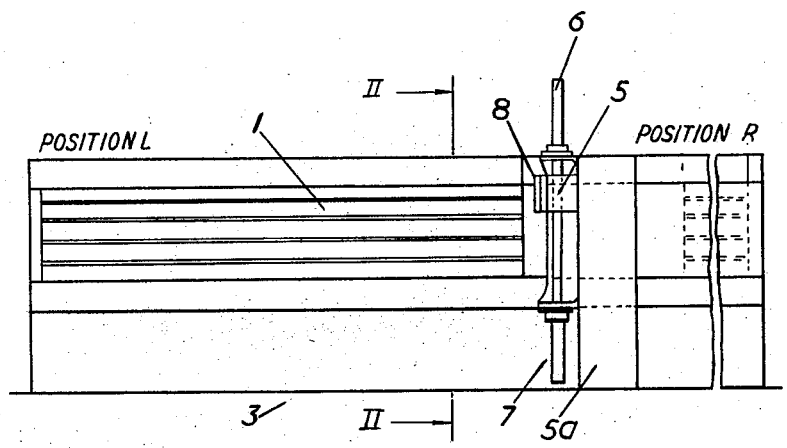
Fig. 1 is a diagrammatic front elevation of the machine.

The tool carriage or broach bar 1 of this machine is fitted with four lines of broaches, P, $P_1$, $P_2$ and $P_3$, for broaching during all motions of the tool carriage. One or more of these lines of broaches may be omitted to provide a free path for the return of the tool carriage when such is required to suit a particular sequence of removing metal from a workpiece.

The tool carriage carried on guides 2 in the frame 3 is reciprocated between positions L and R in the usual manner by means of a hydraulic cylinder 4 (Fig. 2), or in any other manner.

The work table or carriage 5 guided on the support 5a is reciprocated across the path of the broach tools to adopt any of the positions A, B, C and D. The movement of the work carriage is effected by two hydraulic rams 6 and 7 but any other method of providing the movement could be used.

The work piece 8 illustrated is a turbine rotor rim, in which blade slots or notches are to be broached.

There are many possible sequences or cycles of operation available some of which will now be described.

*Example 1*

In a cycle employing only one-way broaching, one line of broaches, say $P_3$, is omitted and the other lines are all arranged for cutting on one and the same direction of travel, say on movement of the tool carriage from L to R. In this cycle the work carriage 5 holding the work piece 8, is moved to position D during each return stroke of the tool carriage and the work is progressively operated upon at positions A, B and C. If the part to be broached is a wheel or disc which requires spaced notches around its periphery the work carriage can be provided with an indexing table which indexed the work piece about its axis as required. By following the above cycles, each notch would be rough broached, semi finished broached and final form broached before being indexed to start the next notch, but by a small alteration to this cycle, the whole work piece could be rough broached all round by lines of broaches P and $P_1$ followed by finished form broaching all round the periphery by broaches $P_2$.

*Example 2*

Alternatively only line P of broaches are fitted and the work is operated upon only at station A, being moved transversely to station B during return strokes.

*Example 3*

In another cycle of operations lines $P_1$ and $P_2$ of broaches are omitted and lines P and $P_3$ of broaches are oppositely facing. In this case a turbine rotor rim can be rough cut all round its periphery by broaches P, using path $P_1$ for the idle return strokes. The finishing cut being performed all round by line $P_3$ of broaches using path $P_2$ for the idle return strokes.

*Example 4*

In yet another alternative cycle, no broaches are fitted in lines $P_1$ and $P_3$, and the lines of broaches P and $P_2$ are arranged to operate in one and the same direction. In this case the work carriage is moved to station B after each of a series of rough cutting strokes by line P of broaches and after each of a series of finishing cut strokes by line $P_2$ of broaches.

The machine can be fitted with conventional automatic control gear, either mechanical, electric or hydraulic enabling it to carry out any of the above or modified cycles of operation as suits the particular job.

The machine illustrated may be modified by the omission altogether of path $P_3$ leaving paths $P$, $P_1$ and $P_2$.

In this case paths $P$ and $P_2$ are fitted with broaches and path $P_1$ has no broaches and is for the return idle strokes.

A machine, so arranged, can be used for three different cycles which include "one-way" and "two-way" broaching. The desired cycle can be selected in known manner by push button or the like and the same broaches can be used for the first two described cycles but different broaches are required for the last cycle described.

In the following examples the work piece is a turbine rotor disc or rim.

*Example 5*

The modified machine has oppositely disposed lines of broaches in lines $P$ and $P_2$ for "two-way" cutting. Line $P_2$ of the broaches rough cut in a slot in the rim when the tool slide moves from R to L. The work carriage is then shuttled across and the slot is finished cut by broaches $P$ when the tool slide moves from L to R. The work piece is indexed and the same cycle is repeated until all slots have been broached all round the periphery. In this cycle all strokes are cutting strokes. Such a cycle falls within the concept of the parent application.

*Example 6*

In this cycle the same broaches are used as in Example 5 but the cycle is changed to one which includes idle return strokes. This cycle is selected for rims which distort if broached as in Example 5.

Line $P_2$ of broaches rough cut slots in the rim when the tool slide moves from R to L and path $P_1$ is used for the idle return stroke. When the rim has been indexed and rough cut all round its periphery, it is similarly finish cut all round by broaches $P$ which cut when the tool carriage moves from L to R. The same path $P_1$ is used for the idle return strokes.

*Example 7*

In an alternative cycle the broaches are changed to allow "one-way" broaching to be adopted, and the cycle includes idle return strokes. Line $P$ of broaches rough cut the rim when the tool carriage moves from L to R. The work carriage is then shuttled across and the tool carriage moves from R to L through path $P_1$ on an idle return stroke. This part of the cycle is repeated until all slots have been rough cut in the work piece. The work carriage is then moved to allow $P_2$ finishing broaches to finish each slot, in which case the tool carriage moves from L to R and path $P_1$ is used for the idle return strokes. This part of the cycle is repeated until the rim has been finished broached all round.

I claim:

A surface broaching machine comprising a reciprocal broach bar having on its working face at least three longitudinally disposed parallel broach tool supports spaced transversely of said bar, a work holding table movable transversely of the working face of said broach bar and including means for supporting a workpiece in operative relation to the working face of said bar at a plurality of transversely spaced stations comprising two extreme stations and at least one intermediate station which are operatively set relative to said respective tool supports, a plurality of tools carried by said supports, the tools on certain of said supports set to broach in one direction of movement of said bar and the tools on certain of the other supports set to broach in the reverse direction of movement of said bar, means for selectively shifting said work table to any one of said stations in operative relation to said tool supports for broaching in said one direction and for selectively moving the table to another of said stations for broaching on a reverse stroke of the bar.

References Cited in the file of this patent

UNITED STATES PATENTS 2,072,563   Lynch et al. _____ Mar. 2, 1937